United States Patent
Burvill et al.

(10) Patent No.: US 9,145,195 B2
(45) Date of Patent: Sep. 29, 2015

(54) AIRCRAFT PANEL STRUCTURE AND AIRCRAFT PANEL STRUCTURE MANUFACTURING METHOD FOR ALLEVIATION OF STRESS

(75) Inventors: Thomas Burvill, Bristol (GB); Raymond Bullock, Bristol (GB)

(73) Assignee: Airbus Operations Limited, Bristol (GB)

( * ) Notice: Subject to any disclaimer, the term of this patent is extended or adjusted under 35 U.S.C. 154(b) by 733 days.

(21) Appl. No.: 13/299,620

(22) Filed: Nov. 18, 2011

(65) Prior Publication Data

US 2012/0135200 A1    May 31, 2012

(51) Int. Cl.
| | | |
|---|---|---|
| B32B 3/28 | (2006.01) | |
| B23P 11/00 | (2006.01) | |
| B32B 3/02 | (2006.01) | |
| B32B 7/04 | (2006.01) | |
| B32B 7/08 | (2006.01) | |
| B64C 1/12 | (2006.01) | |

(52) U.S. Cl.
CPC .............. B64C 1/12 (2013.01); *Y10T 29/49826* (2015.01); *Y10T 428/24628* (2015.01); *Y10T 428/24826* (2015.01)

(58) Field of Classification Search
CPC .............. B64C 1/12; Y10T 428/24628; Y10T 29/49826; Y10T 428/24826
USPC .............. 52/573.1; 244/123.1, 123.12, 129.1, 244/131
See application file for complete search history.

(56) References Cited

U.S. PATENT DOCUMENTS

| | | | | |
|---|---|---|---|---|
| 2,395,205 A | * | 2/1946 | Watter | 52/506.06 |
| 3,299,598 A | * | 1/1967 | Alleaume | 428/604 |
| 3,395,438 A | * | 8/1968 | Seeff | 428/604 |
| 3,638,992 A | * | 2/1972 | Forshee | 296/39.1 |
| 3,794,348 A | * | 2/1974 | Fischer | 280/784 |

(Continued)

FOREIGN PATENT DOCUMENTS

| | | |
|---|---|---|
| WO | WO 80/02254 | 10/1980 |
| WO | WO 2008/068523 | 6/2008 |
| WO | WO 2008/139214 | 11/2008 |

OTHER PUBLICATIONS

Davis et al., Structural Efficiency Studies of Corrugated Compression Panels with Curved Caps and Beaded Webs, NASA Technical Paper 2272, Feb. 1984 (26 pages).*

(Continued)

*Primary Examiner* — Rodney Mintz
(74) *Attorney, Agent, or Firm* — Nixon & Vanderhye P.C.

(57) ABSTRACT

An aircraft panel assembly comprising a first panel constructed from a first sheet material having a first thermal expansion coefficient, the first panel comprising a first face, a second panel constructed from a second sheet material having a second thermal expansion coefficient different from the first thermal expansion coefficient, the second panel comprising a second face facing the first face, the first and second panels being joined at a first discrete fastening point and a second discrete fastening point, the fastening points being connected by a first notional panel join line describing the shortest distance between the fasteners along the first face, and a second notional panel join line describing the shortest distance between the fasteners along the second face, in which the first panel comprises a stress relief feature between the fastening points such that the first notional panel join line diverges from, and converges with, the second notional panel join line.

17 Claims, 4 Drawing Sheets

(56) References Cited

U.S. PATENT DOCUMENTS

| | | | |
|---|---|---|---|
| 4,057,263 A * | 11/1977 | Schwuchow et al. | 280/797 |
| 4,084,029 A * | 4/1978 | Johnson et al. | 428/119 |
| 4,198,018 A * | 4/1980 | Brault | 244/119 |
| 4,291,081 A * | 9/1981 | Olez | 428/119 |
| 4,299,871 A * | 11/1981 | Forsch | 428/104 |
| 4,331,723 A * | 5/1982 | Hamm | 428/61 |
| 4,413,840 A * | 11/1983 | Shah | 280/784 |
| 4,472,473 A * | 9/1984 | Davis et al. | 428/184 |
| 4,684,151 A * | 8/1987 | Drewek | 280/784 |
| 4,769,968 A * | 9/1988 | Davis et al. | 52/798.1 |
| 4,783,228 A * | 11/1988 | Aker et al. | 156/64 |
| 4,786,343 A * | 11/1988 | Hertzberg | 156/93 |
| 4,893,964 A * | 1/1990 | Anderson | 403/376 |
| 4,909,655 A * | 3/1990 | Anderson | 403/267 |
| 4,966,802 A * | 10/1990 | Hertzberg | 428/119 |
| 5,476,704 A * | 12/1995 | Kohler | 428/119 |
| 5,639,535 A * | 6/1997 | McCarville | 428/119 |
| 5,743,063 A * | 4/1998 | Boozer | 52/713 |
| 5,848,765 A * | 12/1998 | Gillespie | 244/124 |
| 6,187,411 B1 * | 2/2001 | Palmer | 428/102 |
| 6,374,570 B1 * | 4/2002 | McKague, Jr. | 52/762 |
| 6,427,945 B1 * | 8/2002 | Bansemir | 244/129.1 |
| 6,718,713 B2 * | 4/2004 | McKague et al. | 52/309.13 |
| 6,976,343 B2 * | 12/2005 | McGushion | 52/840 |
| 7,244,487 B2 * | 7/2007 | Brantley et al. | 428/119 |
| 7,611,595 B2 * | 11/2009 | Barnes | 156/148 |
| 8,042,315 B2 * | 10/2011 | Ashton et al. | 52/783.19 |
| 8,245,971 B2 * | 8/2012 | Makela et al. | 244/123.12 |
| 8,518,518 B2 * | 8/2013 | Blot et al. | 428/102 |
| 8,636,252 B2 * | 1/2014 | Pook et al. | 244/119 |
| 8,636,865 B2 * | 1/2014 | Von Varendorff et al. | 156/228 |
| 8,925,285 B2 * | 1/2015 | Brewerton | 52/783.13 |
| 2002/0053175 A1 * | 5/2002 | McKague et al. | 52/309.13 |
| 2002/0081415 A1 * | 6/2002 | Toi et al. | 428/102 |
| 2002/0189195 A1 * | 12/2002 | McKague et al. | 52/783.19 |
| 2004/0055248 A1 * | 3/2004 | Grillos | 52/783.1 |
| 2004/0213953 A1 * | 10/2004 | Brantley et al. | 428/119 |
| 2005/0003145 A1 * | 1/2005 | Toi et al. | 428/102 |
| 2005/0064134 A1 * | 3/2005 | Brantley et al. | 428/119 |
| 2006/0207212 A1 * | 9/2006 | Durney | 52/731.7 |
| 2009/0041985 A1 | 2/2009 | Von Varendorff et al. | |
| 2009/0065644 A1 * | 3/2009 | Jacques | 244/123.1 |
| 2009/0309264 A1 * | 12/2009 | Cavaliere | 264/319 |
| 2010/0126281 A1 * | 5/2010 | Cosentino | 73/802 |
| 2010/0181427 A1 * | 7/2010 | Makela | 244/123.12 |
| 2010/0247838 A1 * | 9/2010 | Burpo et al. | 428/63 |
| 2010/0252681 A1 * | 10/2010 | Grillos | 244/119 |
| 2011/0315824 A1 * | 12/2011 | Pook et al. | 244/133 |
| 2012/0043422 A1 * | 2/2012 | Campana | 244/123.1 |
| 2012/0052247 A1 * | 3/2012 | Pook et al. | 428/161 |
| 2013/0026297 A1 * | 1/2013 | McCullough et al. | 244/131 |
| 2013/0139961 A1 * | 6/2013 | Gear et al. | 156/247 |
| 2013/0340370 A1 * | 12/2013 | Brewerton | 52/515 |
| 2014/0186586 A1 * | 7/2014 | Victorazzo | 428/167 |
| 2014/0209744 A1 * | 7/2014 | Marcoe et al. | 244/123.1 |
| 2014/0272317 A1 * | 9/2014 | Polewarczyk et al. | 428/174 |
| 2015/0004357 A1 * | 1/2015 | Schimmler et al. | 428/131 |
| 2015/0008284 A1 * | 1/2015 | Thomas et al. | 244/119 |

OTHER PUBLICATIONS

UK Search Report dated Mar. 10, 2011 for Application No. GB1020152.3.

* cited by examiner

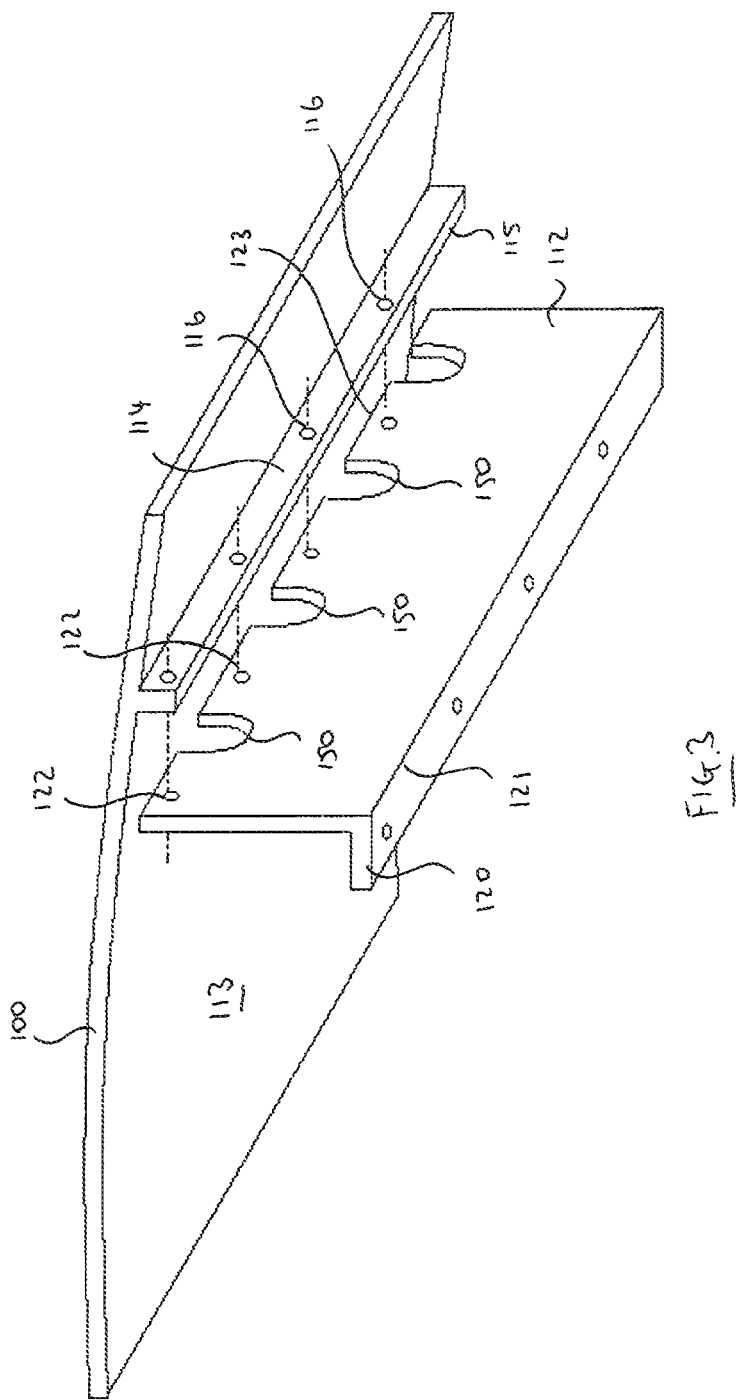

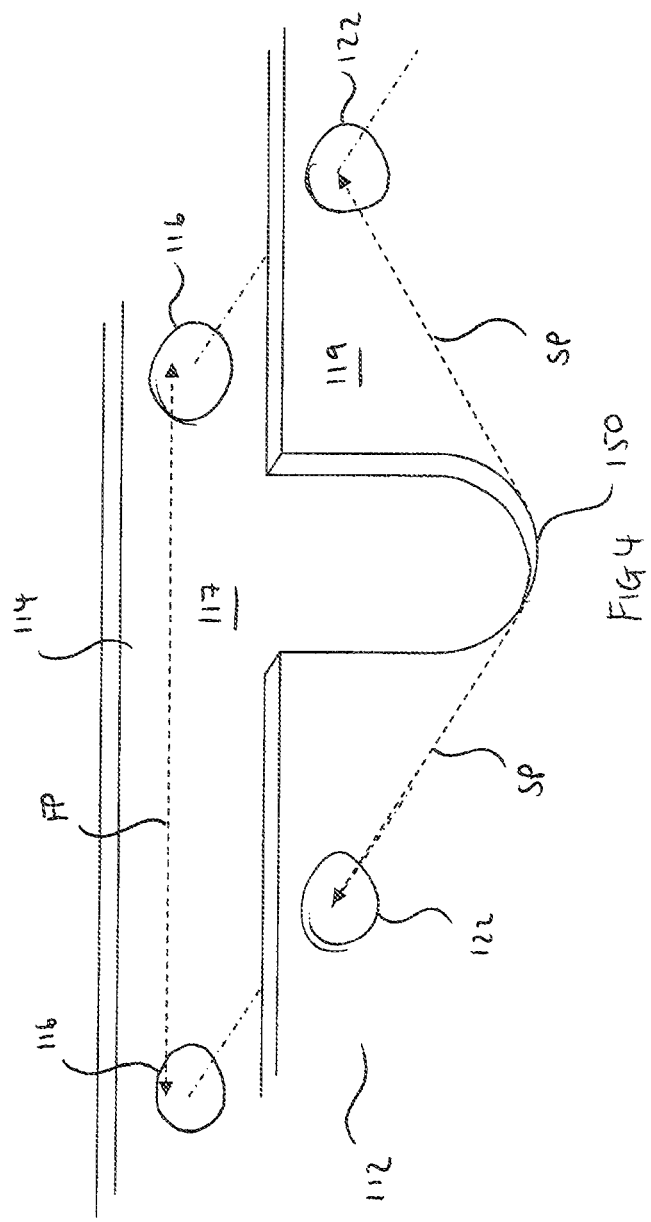

AIRCRAFT PANEL STRUCTURE AND AIRCRAFT PANEL STRUCTURE MANUFACTURING METHOD FOR ALLEVIATION OF STRESS

RELATED APPLICATION

This application claims priority to GB Application No. 1020152.3, filed 29 Nov. 2010, the entire contents of each of which are hereby incorporated by reference.

BACKGROUND OF INVENTION

The present invention is concerned with an aircraft panel structure and manufacturing method for the alleviation of stress. In particular, the following invention is concerned with an aircraft panel structure and manufacturing method for the alleviation of stress between two joined panels having different thermal expansion coefficients.

In aircraft design it is common to attach two panels having different thermal expansion coefficients. Such panels are often constructed from different materials such as composite and metal materials. If two such panels are joined at two discreet, spaced fastening points along their length, a decrease in temperature (as the aircraft ascends) will result in a different level of contraction between the fastening points for each material. This induces significant undesirable stresses in the materials and also in the fastening means (e.g. bolts).

Traditionally this problem has been alleviated with the use of clearance fixed bolts, however the use of such bolts reduces the joined components' resistance to fatigue and consequently the components have to be made larger and heavier in order to account for this reduction. This is undesirable.

SUMMARY OF INVENTION

It is an aim of the present invention to overcome or at least alleviate the above problem.

According to a first aspect of the invention there is provided an aircraft panel assembly comprising a first panel constructed from a first sheet material having a first thermal expansion coefficient, the first panel comprising a first face, a second panel constructed from second sheet material having a second thermal expansion coefficient different to the first thermal expansion coefficient, the second panel comprising a second face facing the first face, the first and second panels being joined at a first discrete fastening point and a second discrete fastening point, the fastening points being connected by a first notional panel join line describing the shortest distance between the fasteners along the first face, and a second notional panel join line describing the shortest distance between the fasteners along the second face, in which the first panel comprises a stress relief feature between the fastening points such that the first notional panel join line diverges from, and converges with, the second notional panel join line.

According to a second aspect of the invention, there is provided a method of manufacturing an aircraft panel assembly comprising the steps of providing a first panel constructed from a first sheet material having a first thermal expansion coefficient, the first panel comprising a first face and defining a stress relief feature, providing a second panel constructed from second sheet material having a second thermal expansion coefficient different to the first thermal expansion coefficient, the second panel comprising a second face facing the first face, joining the first and second panels at a first discrete fastening point and a second discrete fastening point, such that the fastening points are connected by a first notional panel join line describing the shortest distance between the fasteners along the first face, and a second notional panel join line describing the shortest distance between the fasteners along the second face, and such that the first notional panel join line diverges from, and converges with, the second notional panel join line at the stress relief feature.

By providing diverging and converging join lines, the load path along the first face is made longer and therefore the first panel can safely deform by a higher degree than if it were flat.

SUMMARY OF THE DRAWINGS

An example aircraft structure and manufacturing method will now be described with reference to the accompanying drawings in which:

FIG. 1a is a cross-section of the panel assembly of FIG. 1;

FIG. 3 is a perspective view of a second embodiment of a panel assembly in accordance with the present invention; and FIG. 4 is an exploded perspective view of the panel assembly of FIG. 3.

DETAILED DESCRIPTION OF THE INVENTION

Figure 1:
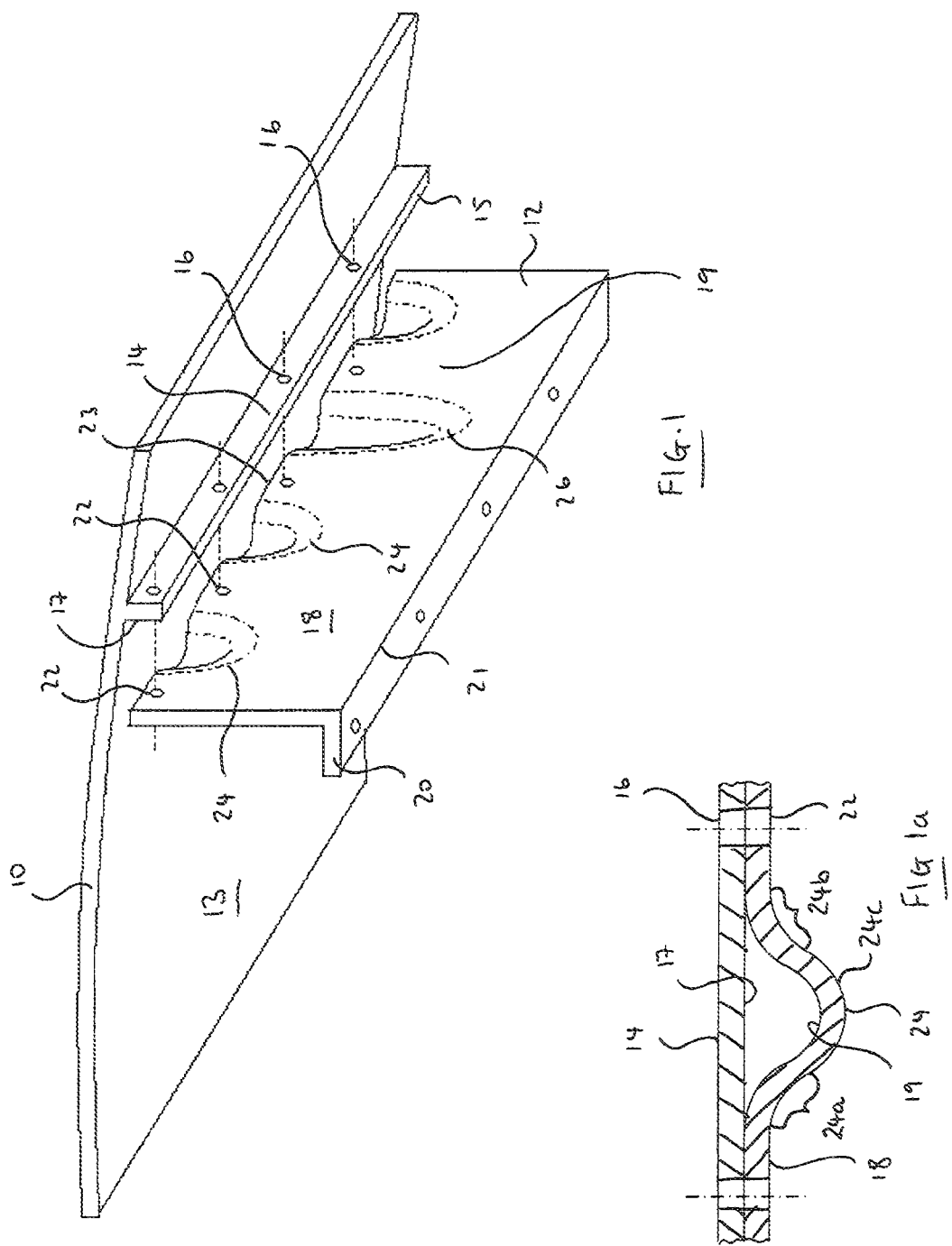
FIG. 1 is a perspective view of an aircraft panel assembly according to the present invention.

Referring to FIG. 1, there is provided a part of an aircraft wing comprising a composite cover piece 10 and a metallic wing spar 12 for connection thereto. The cover piece 10 comprises a generally curved cover plate 13 having a downwardly depending straight flange 14 defining a plurality of through bores 16. The flange 14 has a free edge 15 opposite the plate 13, and a face 17.

The spar 12 is constructed from metallic material and comprises a panel section 18 having a depending flange 20, a first edge 21 thereof, and a plurality of through bores 22 at a second opposite edge 23. It will be noted that the through bores 22 are spaced by the same distance as a through bores 16 in the flange 14 of the cover 10. The panel section 18 defines a further face 19.

Between each of the through bores 22 there is provided a corrugation or bead 24 which comprises an out of plane deformation of the panel 18. As will be seen in FIGS. 1a and 2, the corrugations 24 are curved in nature to avoid any stress concentrations in the material. Such features can be press-formed or machined.

Figure 2:
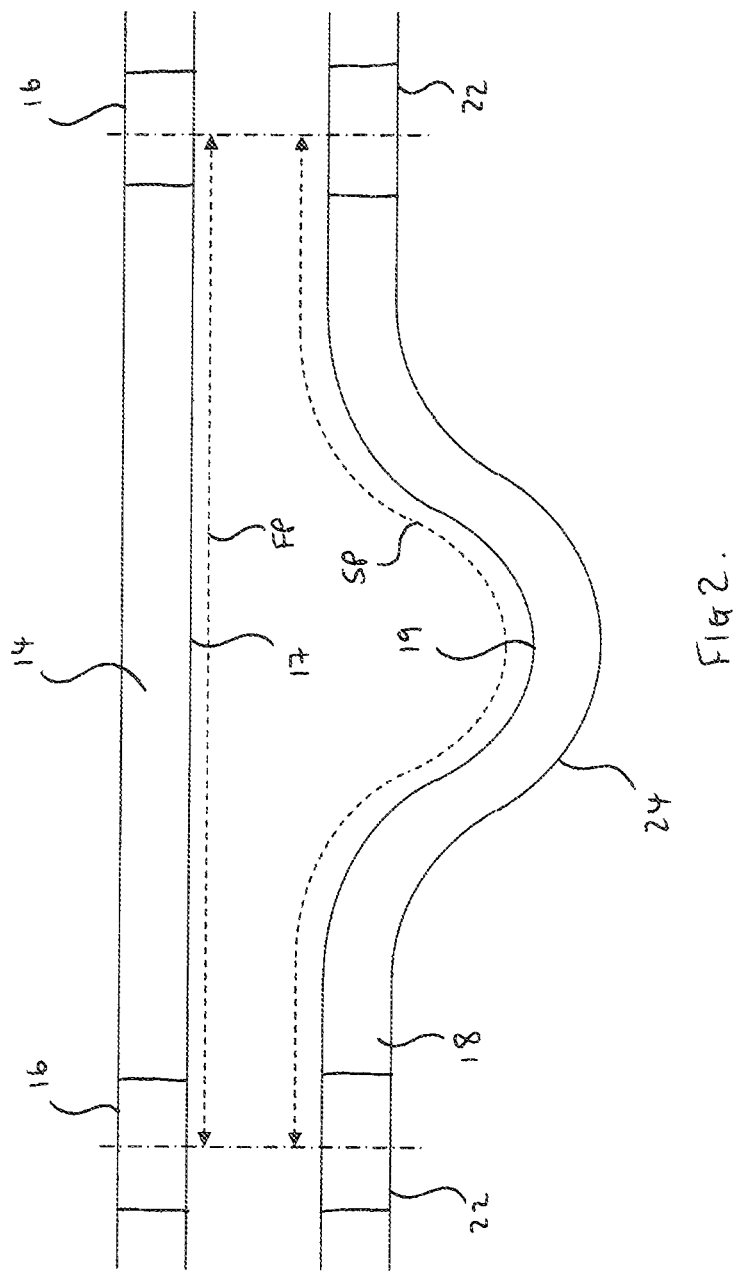
FIG. 2 is an exploded cross-section of the panel assembly of FIG. 1.

Each corrugation or bead 24 has three circle-segment portions 24a, 24b, 24c as shown in FIG. 2. Portions 24a and 24b are joined with the panel 18 either side of the portion 24c. The portions 24a and 24b form smooth transitions with the panel 18 and describe approximately 45 degree circle-segments with their origins on a side of the panel 18 opposite flange 14. The intermediate segment 24c describes an approximately 90 degree circle-segment adjoining segments 24a and 24b in a smooth transition. The intermediate circle-segment origin is towards the flange 14.

Each corrugation or bead 24 tapers to a flat surface from the second edge 23 towards the first edge 21.

Referring to FIG. 2, the faces 17, 19 face each other and are in abutment at the bores 16, 22. A first notional join line, flange path FP defines the shortest distance along the face 17 between the centres of adjacent bores 16. A second notional join line, spar path SP defines the shortest distance along the further face 19 between adjacent bores 22. It will be noted that due to the curvature of the bead 24, the spar path SP is somewhat longer than the flange path FP. In other words, the spar path SP diverges from, and converges with, the flange path FP. Therefore the spar has the ability to elastically deform between the bores 22 by a greater degree than if it was a flat panel. Therefore, upon cooling (or heating), the tensile load between the bores 22 applied by the relative contraction (or expansion) of the flange 14 can be absorbed by a "flattening" of the bead 24 without a significant increase in stress in the spar 12.

One of the beads 26 is longer than the other beads and runs further towards the flange 20 in order to provide a stiffening effect on the component 12.

Referring to FIG. 3, an alternative arrangement is shown in which a panel assembly comprises a composite cover panel 100 and a metal spar 112 in which common features with the aforementioned embodiment are 100 greater. Instead of the out of plane corrugations 24, 26 as shown in FIGS. 1 and 2, the spar 112 comprises a u-shaped cut out 150 between each of the through bores 122.

It will be noted that again, the spar path SP is somewhat longer than the flange path FP.

In both of the above embodiments the thermal expansion coefficient of the composite material making up the cover 10, 100 is lower than that of the metallic spar 12, 112.

Therefore, as the components are cooed, the cover 10, 100 will shrink by a given amount. A similar, although greater effect will also be experienced by the metallic spar 12, 112. Therefore the panel 18 will try to shrink by a larger amount than the flange 14. Stresses which would otherwise be created by this difference are alleviated by the fact that the spar components 12, 112 can elastically deform by flattening out the corrugations 24, 26 or alternatively by pulling apart the opposing faces of the u-shaped formations 150. In effect, by allowing the components 12, 112 to elastically deform by a greater degree by providing a longer load path, high stresses in that component are alleviated. In other words, the corrugations 24, 26 or the u-shaped formations 150 absorb the additional shrinkage caused by the difference in thermal expansion coefficients.

Variations in the above embodiments may fall within the present invention.

For example, any type of fastener such as rivets or spot welds can be used instead of bolts. Any suitable shape may be used in place of the corrugations or u-shaped cut outs (castellations) mentioned in the above embodiments.

Furthermore, the stress relieving features may be provided in both components and are dimensioned appropriately bearing in mind the relative thermal coefficients of expansion.

The invention claimed is:

1. An aircraft panel assembly comprising:
a first aircraft panel formed of a first sheet material having a first thermal expansion coefficient, the first aircraft panel comprising a first face;
a second aircraft panel formed of a second sheet material having a second thermal expansion coefficient different from the first thermal expansion coefficient, the second aircraft panel comprising a second face facing the first face,
the first and second aircraft panels joined at a first discrete fastening point by at least one fastener and at a second discrete fastening point by another fastener,
the first and second discrete fastening points aligned along a first notional panel join line defining the shortest distance between the fasteners along the first face, and a second notional panel join curvilinear line describing the shortest distance between the fasteners along the second face, wherein the second notional panel join curvilinear line is longer than the first notional panel join line,
a stress relief feature is formed by the second notional panel join curvilinear line diverging from the first notional panel join line between the first and second discrete fastening points, and the second notional panel join curvilinear line converges to the first notional panel join line at each of the first and second discrete fastening points, and
wherein said first aircraft panel comprises a structural component of an aircraft and said second aircraft panel comprises an aircraft skin or a second structural component of the aircraft.

2. An aircraft panel assembly comprising:
a first aircraft panel constructed from a first sheet material having a first thermal expansion coefficient, the first aircraft panel comprising a first face,
a second aircraft panel constructed from a second sheet material having a second thermal expansion coefficient different from the first thermal expansion coefficient, the second aircraft panel comprising a second face facing the first face,
the first and second aircraft panels being joined at a first discrete fastening point by at least one fastener and at a second discrete fastening point by another fastener,
the first and second discrete fastening points being connected by a first notional panel join line describing the shortest distance between the at least one fastener and the another fastener along the first face, and a second notional panel join line describing the shortest distance between the fasteners along the second face, wherein said first notional panel join line is shorter than said second notional panel join line,
in which the first aircraft panel comprises a stress relief feature between the fastening points, wherein the stress relief feature includes the second notional panel join line diverging from the first notional panel join line between the first and second discrete fastening points and converges with the first notional panel join line at each of the first and second discrete fastening points, and
in which said first aircraft panel comprises a structural component of an aircraft and said second aircraft panel comprises an aircraft skin or a second structural component of the aircraft.

3. The aircraft panel assembly according to claim 2, wherein said first aircraft panel comprises a metal aircraft spar and the second aircraft panel comprises a composite aircraft cover.

4. The aircraft panel assembly according to claim 2, wherein said stress relief feature enables elastic deformation of said second aircraft panel.

5. The aircraft panel assembly according to claim 2 in which the stress relief feature is configured such that the first notional join line diverges out of a generally smooth surface defined by the first aircraft panel.

6. The aircraft panel assembly according to claim 5 in which the first aircraft panel stress relief feature tapers out along the generally smooth surface of the first aircraft panel moving away from the fastening points.

7. The aircraft panel assembly according to claim 5 in which the generally smooth surface is planar.

8. The aircraft panel assembly according to claim 5, in which the first aircraft panel stress relief feature is curved in cross-section.

9. The aircraft panel assembly according to claim 8 in which the first aircraft panel stress relief feature is a corrugation.

10. The aircraft panel assembly according to claim 2 in which the stress relief feature is configured such that the first notional join line lies on a generally smooth surface defined by the first aircraft panel.

11. The aircraft panel assembly according to claim 10 in which the stress relief feature is a cut-out in an edge of the first aircraft panel.

12. The aircraft panel assembly according to claim 11 in which the cut-out is U-shaped.

13. The aircraft panel assembly according to claim 2, wherein said stress relief feature is an out of plane deformation of one of said first and second sheets comprising one of a corrugation and bead between said at least one fastener and said at least another fastener.

14. The aircraft panel assembly according to claim 13, wherein said first aircraft panel comprises a metal aircraft spar and the second aircraft panel comprises a composite aircraft cover.

15. The aircraft panel assembly according to claim 2, wherein said stress relief feature is a U-shaped cutout in one of said first and second sheets between said at least one fastener and said at least another fastener.

16. The aircraft panel assembly according to claim 15, wherein said first aircraft panel comprises a metal aircraft spar and the second aircraft panel comprises a composite aircraft cover.

17. A method of manufacturing an aircraft panel assembly comprising the steps of:

providing a first aircraft panel constructed from a first sheet material having a first thermal expansion coefficient, the first aircraft panel comprising a first face, said first face including at least one stress relief feature, providing a second aircraft panel constructed from a second sheet material having a second thermal expansion coefficient different from the first thermal expansion coefficient, the second aircraft panel comprising a second face facing the first face, joining the first and second aircraft panels at a first discrete fastening point by at least one fastener and at a second discrete fastening point by at least another fastener, such that the fastening points are connected by a first notional panel join line describing the shortest distance between the at least one fastener and the another fastener along the first face, and a second notional panel join line describing the shortest distance between the fasteners along the second face, and such that the first notional panel join line diverges from the second notional panel join line, converges with the second notional panel join line at each of the first and second discrete fastening points and diverges from the second notional panel join line between the first and second discrete fastening points, wherein the divergence forms the stress relief feature, wherein said first notional panel join line is shorter than said second notional panel join line, and wherein said first aircraft panel comprise a structural component of an aircraft and the second aircraft panel comprises an aircraft skin of a structural component of the aircraft.

* * * * *